US012461266B2

(12) United States Patent
Bolshakov et al.

(10) Patent No.: US 12,461,266 B2
(45) Date of Patent: Nov. 4, 2025

(54) SYSTEM AND METHOD FOR SEISMIC IMAGING AROUND WELLBORES

(71) Applicant: Chevron U.S.A. Inc., San Ramon, CA (US)

(72) Inventors: Alexei Olegovich Bolshakov, Pearland, TX (US); Kristoffer Thomas Walker, Kingwood, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 348 days.

(21) Appl. No.: 18/331,102

(22) Filed: Jun. 7, 2023

(65) Prior Publication Data

US 2024/0411042 A1 Dec. 12, 2024

(51) Int. Cl.
*G01V 1/48* (2006.01)

(52) U.S. Cl.
CPC ............ *G01V 1/48* (2013.01); *G01V 2200/16* (2013.01); *G01V 2210/51* (2013.01)

(58) Field of Classification Search
CPC ... G01V 1/48; G01V 2200/16; G01V 2210/51
See application file for complete search history.

(56) References Cited

U.S. PATENT DOCUMENTS

| 8,944,183 | B2 | 2/2015 | Geerits |
| 10,215,884 | B2 | 2/2019 | Donderici |
| 12,140,720 | B2 * | 11/2024 | Hirabayashi ............. G01V 1/44 |

FOREIGN PATENT DOCUMENTS

GB 2435930 A * 9/2007 ............... G01V 1/50

OTHER PUBLICATIONS

Alexei Bolshakov et al., "Sourceless LWD Borehole Acoustics: Field Testing the Concept," SPWLA 63rd Annual Logging Symposium, Jun. 10-15, 2022, p. 16. DOI: 10.30632/SPWLA-2022-0033.
Anna Przebindowska et al., "Double alternate-polarity multipole measurements in borehole acoustics", 10.1190/segam2019-3214945. 1, 2019 SEG International Exposition and 89th Annual Meeting, pp. 854-858.
Christopher V. Kimball et al., "Semblance Processing of Borehole Acoustic Array Data", Geophysics, vol. 49, No. 3 (Mar. 1984); p. 274-281.

* cited by examiner

*Primary Examiner* — Krystine E Breier
(74) *Attorney, Agent, or Firm* — Marie L. Clapp

(57) ABSTRACT

A method is described for method of processing seismic data including obtaining seismic data, wherein the seismic data was acquired with a plurality of azimuthal receiver elements of a logging-while-drilling tool while a drill bit is drilling a wellbore; decomposing the seismic data into monopole and dipole modes; cross-correlating each receiver pair of the monopole mode and of the dipole mode to generate monopole and dipole waveforms; identifying a time of direct arrival of acoustic energy from the drill bit and applying bulk time shift for the waveforms; stacking corresponding waveforms from the bulk time shift to improve signal-to-noise ratio; processing the stacked monopole and dipole waveform to isolate reflected arrivals; performing migration to obtain a monopole migrated image and a dipole migrated image; and classifying the interface as either a fracture or an impedance contrast. The method is executed by a computer system.

4 Claims, 7 Drawing Sheets

SYSTEM AND METHOD FOR SEISMIC IMAGING AROUND WELLBORES

TECHNICAL FIELD

The disclosed embodiments relate generally to techniques for seismic imaging around wellbores. In particular, the disclosed embodiments relate to techniques for seismic imaging using seismic energy generated by the drill bit.

BACKGROUND

The exploration, development, and production of hydrocarbon-bearing reservoirs includes making decisions based on the analysis of many types of technical data. Boreholes are drilled into basins at various dips to the horizontal and dipping layers. These boreholes provide a path by which tools are conveyed to acquire data pertaining to the penetrated formations. Logging while drilling (LWD) tools are often attached to the drilling bit. An LWD tool acquires data that are processed by the LWD tool, recorded to the tool memory and/or sent via telemetry up the corresponding borehole to the surface. The data may be processed and/or interpreted to determine the formation properties, pore fluid properties, borehole structural stability, presence of various boundaries in the formation, etc. There exists a need for new methods for data acquisition and the development of the new processing and/or interpretation data methods from LWD tools to allow for the determination of formation properties that were not available before.

SUMMARY

In accordance with some embodiments, a method of processing seismic data including obtaining seismic data, wherein the seismic data was acquired throughout a region of interest with a plurality of azimuthal receiver elements of a logging-while-drilling tool while a drill bit is drilling a wellbore; decomposing the seismic data into monopole and dipole modes; cross-correlating each receiver pair of the monopole mode and of the dipole mode to generate a monopole waveform and a dipole waveform; identifying a time of direct arrival of acoustic energy from the drill bit and applying bulk time shift for the monopole waveform and the dipole waveform; stacking corresponding waveforms from the bulk time shift to improve signal-to-noise ratio; processing the stacked monopole waveform and the stacked dipole waveform to isolate reflected arrivals; performing migration on the reflected arrivals to obtain a monopole migrated image and a dipole migrated image; and classifying the interface as either a fracture or an impedance contrast using the monopole migrated image and the dipole migrated image is disclosed. In an embodiment, the method is azimuthally-dependent such that prior to the cross-correlating step, the method is binning the monopole mode and the dipole mode into a plurality of azimuth bins; cross-correlating the monopole mode and the dipole mode in each azimuth bin separately; identifying a time of direct arrival of acoustic energy from the drill bit and applying bulk time shift for each of the monopole waveform and the dipole waveform in each of the azimuth bins; stacking corresponding waveforms from the bulk time shift to improve signal-to-noise ratio to generate a stacked monopole waveform and a stacked dipole waveform in each of the azimuth bins; processing the stacked monopole waveform and the stacked dipole waveform to isolate reflected arrivals; performing migration on the reflected arrivals to obtain a monopole migrated image in each of the azimuth bins and a dipole migrated image in each of the azimuth bins; and determining the azimuth from the wellbore to the interface based on amplitude and travel time information in the monopole migrated image and the dipole migrated image. In an embodiment, the obtaining the seismic data may be done by drilling the wellbore in a subsurface volume of interest with a drill string comprising a drill bit and a logging while drilling tool, wherein the logging while drilling tool comprises a plurality of azimuthal receiver elements and wherein the drill bit is utilized as a seismic source; and recording seismic data at the plurality of azimuthal receiver elements continuously throughout formations of interest while the drill bit is drilling the wellbore.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic imaging around boreholes. These embodiments are designed to be of particular use for imaging interfaces in the formations around the borehole.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic compressional and shear velocities can be used to estimate many properties of interest in oil exploration, reservoir development, and production sustaining efforts. Such properties include, but are not limited to, formation lithology, porosity, presence of fractures, principal stresses, pore pressure, and/or formation damage.

High-quality measurements can be obtained by wireline tools that are conveyed down the borehole on a wire, either centralized in the borehole or conveyed against the borehole side. However, sometimes the quality of these measurements is not as important as the cost of acquiring them. This is especially the case when rig time is expensive, and the boreholes are very long. Additionally, the drilling process may cause formation damage due to mud invasion, fracturing, and the like which can reduce the quality of wireline data or even make wireline logging a poor choice due to the risk of formation collapse.

Figure 2:
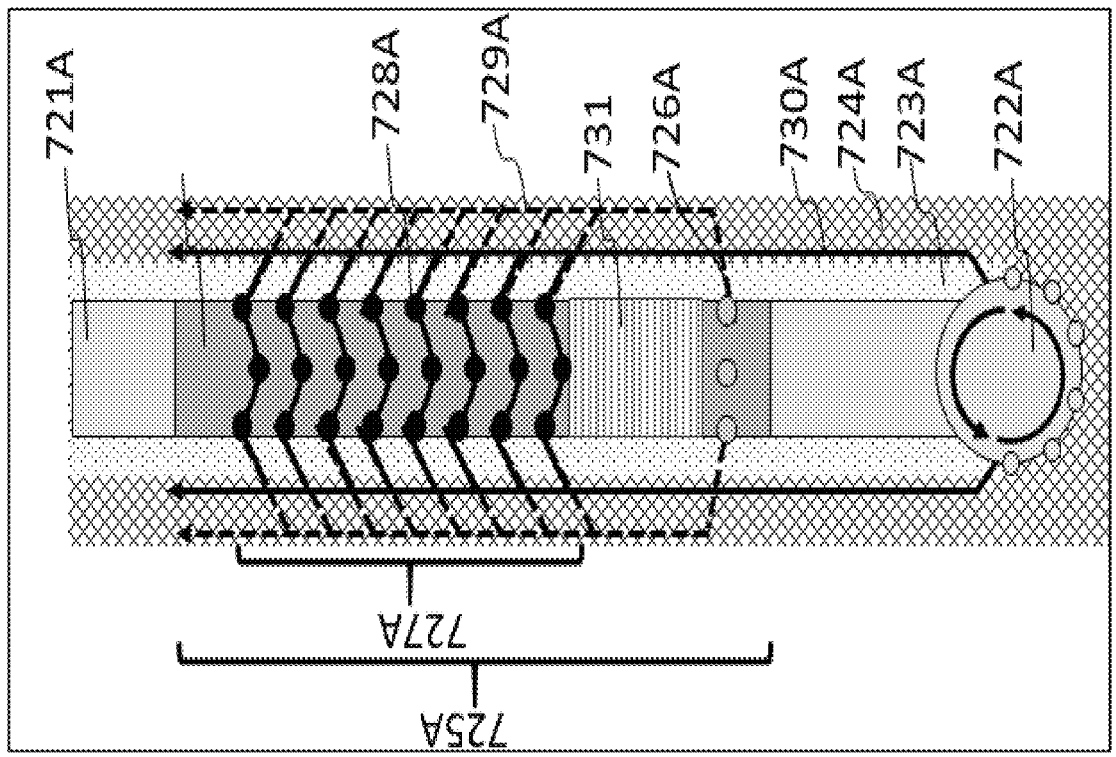
FIG. 2 illustrates a side view of an acoustic LWD tool (725A) with a digitally controlled source (726A) below a receiver array (727A)
Figure 1:
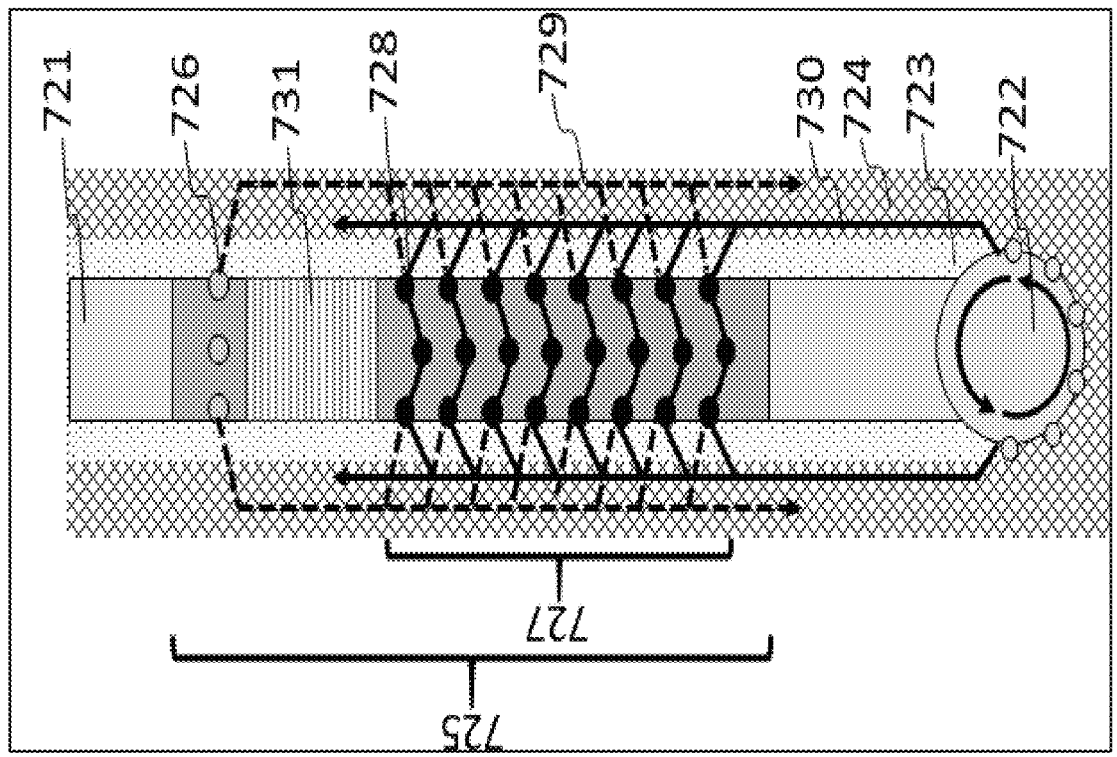
FIG. 1 illustrates a side view of an acoustic LWD tool (725) with a digitally controlled source (726) above a receiver array (727)

An alternative to wireline tool deployment is to use tools that attach to the drill pipe. FIGS. 1 and 2 are schematic drawings of logging while drilling (LWD) acoustic tools in the borehole which have digitally controlled sources above and below the receiver array respectively. As shown, an LWD acoustic tool 725 {725A} is attached to the drill pipe 721 {721A} with a drill bit 722 {722A} at the end of the drill pipe. The tool is placed inside a borehole 724 {724A} which is filled with a drilling mud 723 {723A}. The tool consists of transmitter (source) 726 {726A} and an array of receiver rings 727 {727A}. Each receiver ring 728 {728A} typically has two or four receiver elements spaced azimuthally around the tool axis.

The LWD acoustic source 726 {726A} typically includes four individual piezo-electric monopole sources that are located along the outer edge of the cylindrical tool with 90 degrees azimuthal separation. The four individual piezo-electric monopole sources may be looked on a single ring around the tool. A combination of these sources is excited by an electric current in unison to generate a singular wavefield that has the characteristics of a single source located at the center of the borehole at far distances from these transmitters. For example, when all four sources have the same polarity and are fired in unison, the far-field wavefield represents a single monopole source type. When only two opposing sources are activated and with opposite polarities, the far-field wavefield represents a single dipole source type. When all four sources are activated and with polarities that flip as one goes around the tool circumference, the resulting far-field wavefield represents a single quadrupole source type.

Some of the energy excited by LWD acoustic sources converts to seismic energy at the borehole wall, propagates up the borehole, and converts back to acoustic energy into the drilling fluid where it is recorded by a microphone array with an aperture of 2 to 6 feet located 5 to 10 feet offset from the source (FIGS. 1 and 2). Typical recording durations are 5 to 20 milliseconds. Acoustic energy paths from source 726 {726A} through the mud 723 {723A} and formation 724 {724A} to receiver arrays 727 {727A} are shown by dashed lines 729 {729A}.

In modern acoustic LWD tools, the individual receiver elements which are part of receiver rings 728 {728A} are used to decompose (extract) the mode excited by the LWD acoustic source 726 {726A}. The acoustic energy excited by the source also propagates through the tool body, and this energy is also known as a tool mode and it interferes with the measurement. The acoustic isolator 731 {731A} is placed between the receiver array and the LWD acoustic source to reduce this tool mode energy. The isolator length is typically 5 to 10 feet long.

During a drilling operation, the bottom hole assembly is rotated by a rotary table at the surface or downhole by a mud motor allowing the drilling bit 722 {722A} to rotate and penetrate the bedrock. Rotation of the drill bit imparts compressional, shear, and torsional stresses into the underlying formation. Because of the elastic coupling, these stresses excite multiple modes traveling along the borehole that get recorded on the receiver elements of the tool. The pathway of these modes from the drilling bit to receivers is shown as a solid line 730 {730A}. Note that depending on the position of the acoustic LWD source relative to the receiver array, this energy may travel in the opposite direction compared to the energy excited by LWD acoustic source as in FIG. 1 (729 vs 730) or in the same direction as in FIG. 2 (729A vs 730A).

A user typically wants to position LWD tools as close to the drill bit as possible so that measurements can be made about the formation that is actively being drilled, which enables near-real time drilling decisions to be made. However, the drill bit generates a high level of red spectrum vibrational noise. This noise travels through the stiff drill collar, through the fluid, and along the borehole wall. As a result, this noise is typically treated as detrimental to the conventional LWD acoustic measurement.

Figure 3:
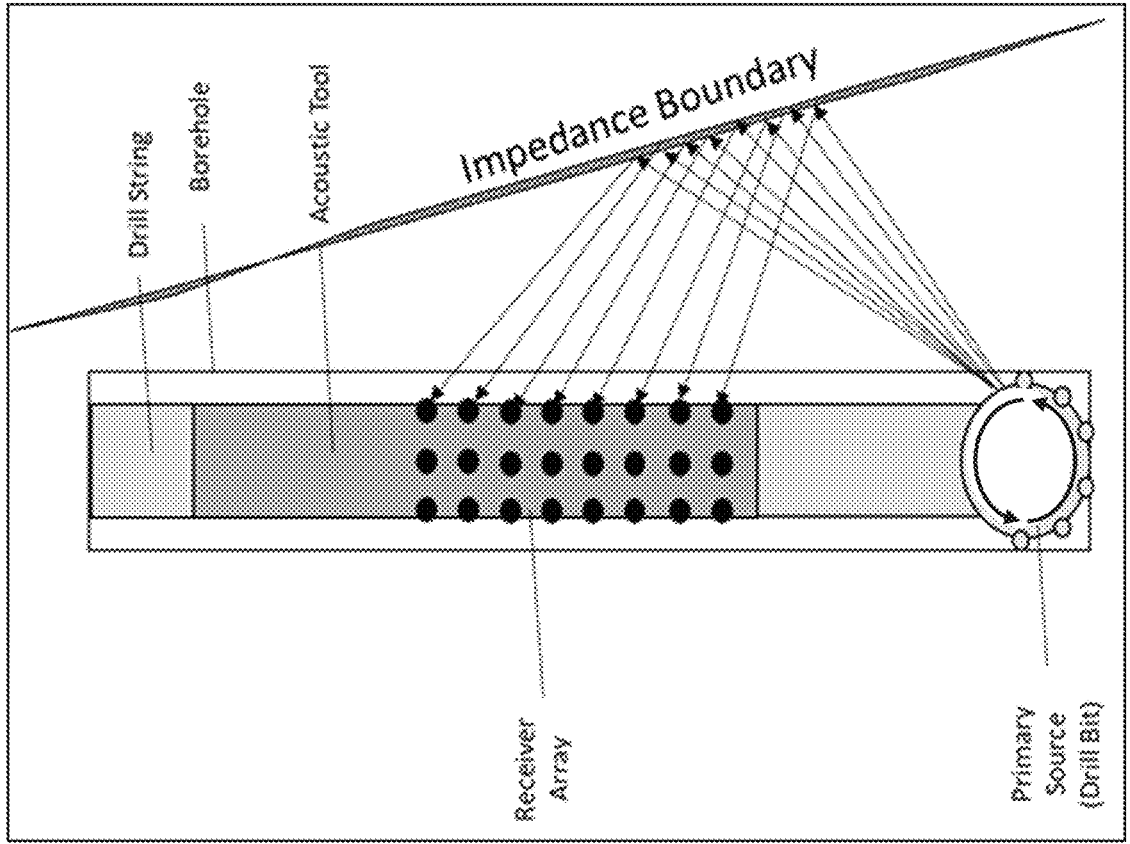
FIG. 3 illustrates an acoustic LWD tool using acoustic energy generated by a drill bit to image impedance boundaries.

On the other hand, the drill bit generates acoustic energy that propagates along the borehole, and the drill bit also generates body waves (compressional and shear) that propagate into the formation. In the presence of the impedance boundaries (fractures, beds, and faults) in the formation, this energy would reflect of these boundaries and the reflected energy can be detected by receivers as shown in FIG. 3. Since this energy is generated by the drill bit, the source presence is not required.

To deal with signal-to-noise (SNR) ratio, the instant disclosure discusses utilizing continuous recording of this energy on the receivers. Some embodiments described herein use hardware in the form of a "logging while drilling" (LWD) acoustic tool. In the process of drilling, the tool continuously records acoustic wavefields generated by the drill bit and these data are utilized to characterize formations around the tool. The instant disclosure describes techniques and algorithms for processing the recorded wavefield to maximize the ratio between signal and noise to detect and image reflections coming from fractures, bed boundaries, faults, and other types of impedance contrasts in the formation. The techniques use the reflective properties of wavefields generated by the drill bit to detect and image geological structures in the near wellbore region. Decomposition of this energy into compressional and shear waves is explained in the section titled "Modal Decomposition" while extracting reflected signals and migrating these into the image are explained in the section titled "Reflector Imaging" and "Interface Imaging Workflow."

Using the drill bit as a source of acoustic energy allows for elimination of the acoustic source in the LWD acoustic tool. In such configuration, the formation properties can be estimated using drill bit as a source, as seen, by way of example, in U.S. Pat. No. 8,944,183. However, the method described in U.S. Pat. No. 8,944,183 only discloses the use of quadrupoles while the current method proposes the use of monopole and dipole here for formation P-wave velocity and S-wave velocity determination. The continuous recording using the drill bit as the source allows for interface imaging as described herein. Advantages of such a configuration are: (1) The tool design is significantly simplified, the tool length is shortened and mechanically the tool is stronger (no need for LWD acoustic isolator which uses cuts in the body of drill collar to attenuate tool mode signal and often is the weakest part of the tool and drilling string). It allows for the placement of the tool closer to the bit and improves SNR. (2) Enables "look-ahead" capability for locating fractures, faults, and bedding interfaces that may (i) present drilling hazards/complexities and/or (ii) guide geosteering and cement/completion planning.

It should be noted that many of the existing LWD tools may be modified to allow for continuous listening, recording, and stacking the drill bit noise and using this noise for reflector imaging. Additionally, the LWD tool can continue "regular" firing of various modes to extract the formation's acoustic properties (compressional and shear velocities). These velocities may then be used to migrate the detected reflections and map the reflectors relative to the well path.

Modal Decomposition: The drill bit imparts compressional, shear, and torsional stresses into the underlying formation. Because of elastic coupling, these stresses excite multiple modes traveling along the borehole and into the formation (as body waves) which get recorded on the receiver elements of the LWD tool. The receiver elements' circular buffers contain energy from multiple modes. Different implementations are used to decompose various modes (monopole and dipole) from the data. After the modal decompositions are constructed, they are processed to obtain reflected signals (as outlined in "Reflector Imaging" section hereinbelow).

Figure 4:
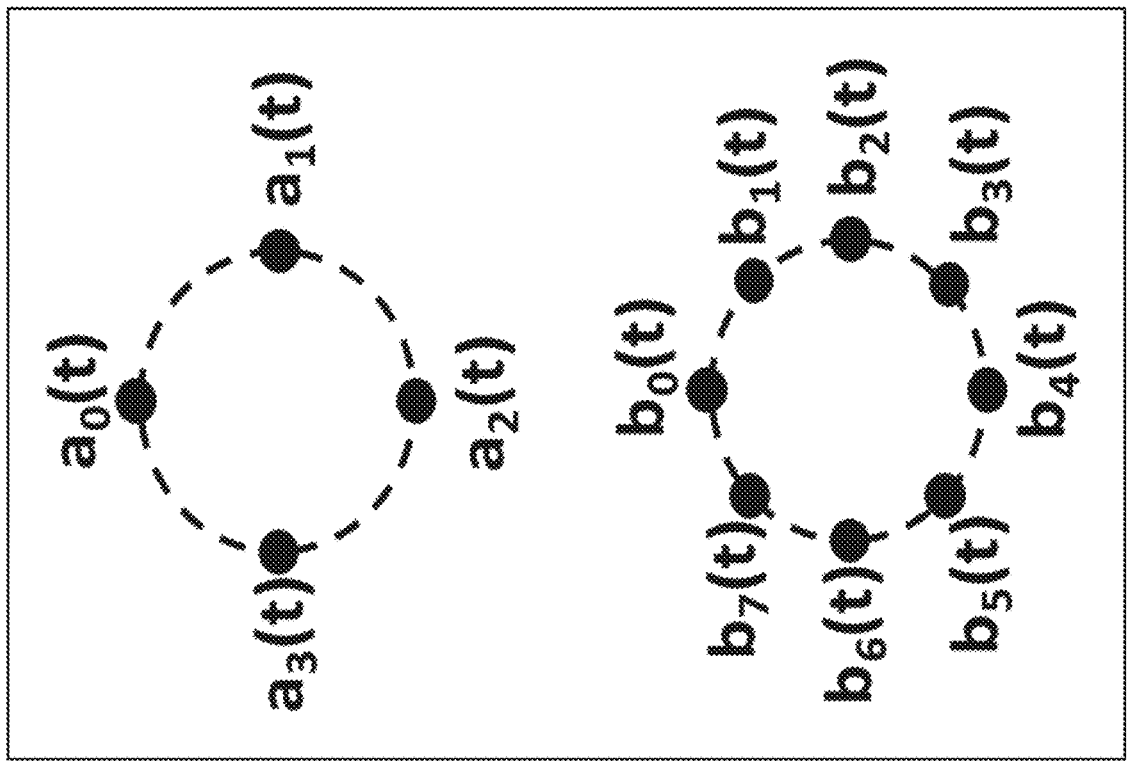
FIG. 4 illustrates an acoustic LWD tool receiver station having 4 (top) and 8 (bottom) receiver elements.

In the following, capital letters M and D are used to denote modal decompositions of monopole and dipole, respectively. The superscripts "4" and "8" refer to the decompositions with receiver rings containing 4 and 8 receiver elements (signals $a_i(t)$ and $b_i(t)$ in FIG. 4) respectively. The first numeric subscript (if present) refers to a particular decomposition implementation and the second subscript (if present) refers to the number of signals used in a decomposition implementation. For example, $D_{i2}^8(t)$ (i=0, ..., 3), stands for a dipole decomposition (D) applied to a receiver ring with 8 elements (superscript "8"), 4 different implementations of this decomposition are possible (first subscript "i" can take values from 0 to 3) and each implementation has 2 elements in it (second subscript is "2"). The absence of the subscripts means that only one realization is possible for a given mode and receiver ring configuration.

The following principles may be used in formulating the modal decompositions in this section.

Rule 1: The pressure distribution in case of a pure multipole source of order n (where n=0 {1, 2, 3, 4}) corresponds to monopole {dipole, quadrupole, hexapole and octupole} sources respectively) has the following azimuthal dependence:

$$P_n(t, r, \theta) = P_s(t, r) \cos(n(\theta_s - \theta_r)), \quad (1)$$

where t is time, (r, θ) are polar coordinates, and $P_s$ is a source pressure signal corresponding to a multipole source of order n.

When using this Rule 1, the user has freedom in how to align the source azimuth $\theta_s$ with the azimuth of the receivers $\theta_r$. Specifically, the user can (a) rotate one of the principal axes of a mode's radiation pattern some angle (could be 0 degrees) to the normal of a particular receiver element's face; and (b) project each receiver element's energy onto this cos (nθ) factor radiation pattern.

Rule 2: The double alternate-polarity principle may be utilized to (a) align one of the principal axes of a mode's radiation pattern to be between normals to the faces of the neighboring receivers; and (b) project each receiver element's energy on this axis using the cos (nθ) factor. Note that Rule 2 is a special case of Rule 1 where the rotation angle maximizes the modal SNR achieved by the decomposition equation, but its use is limited to certain angles of rotation.

Monopole: The monopole modes are extracted using the average of signals recorded on separate receiver elements at each receiver ring:

$$M^4(t) = 0.25 \sum_{i=1}^{4} a_i(t), \quad (2)$$

$$M^8(t) = 0.125 \sum_{i=1}^{8} b_i(t).$$

Dipole: In the case of a 4 receiver-element ring, the dipole modes are extracted in the following way:

$$D_{i2}^4(t) = a_i(t) - a_{2+i}(t), \quad (3)$$

$$i = 0, 1.$$

The double-alternate polarity principle may be utilized to improve SNR in this case:

$$D_{i4}^4(t) = a_i(t) + a_{i+1}(t) - (a_{i+2}(t) + a_{(i+3)\%4}(t)), \quad (4)$$

$$i = 0, 1,$$

where "% n" is a modulo operator which produces the remainder of division by n.

For 8 receiver-element rings, the user may use 3 different techniques to obtain dipole modes. Each of these techniques would produce 4 implementations of the dipole decomposition:

$$D_{i2}^8(t) = b_i(t) - b_{i+4}(t), \quad (5)$$

$$i = 0, ..., 3,$$

$$D_{i4}^8(t) = (b_i(t) + b_{i+1}(t)) - (b_{i+4}(t) + b_{(i+5)\%8}(t)), \quad (6)$$

$$i = 0, ..., 3,$$

$$D_{i6}^8(t) = b_{i+1}(t) - b_{(i+5)\%8}(t) + (b_i(t) + b_{i+2}(t) - b_{i+4}(t) - b_{(i+6)\%8}(t))/\sqrt{2}, \quad (7)$$

-continued $$i = 0, \ldots, 3.$$

In this case, (5) uses the same principle as in (3) by subtracting opposite receiver elements' signals while (6) and (7) use rules 1 and 2 described above correspondingly.

Reflector Imaging: The noise generated by the drill bit can be used to image impedance contrasts and shear-free surfaces (as in the case of fluid or gas filled fractures) that are reflective to compressional and/or shear excitation. This is the case because noise generated by the drill bit not only propagates along the borehole but also travels into the formation in the form of compressional and shear body waves, and when reflected from impedance boundaries, can be detected by the LWD tool's receivers.

Figure 5:
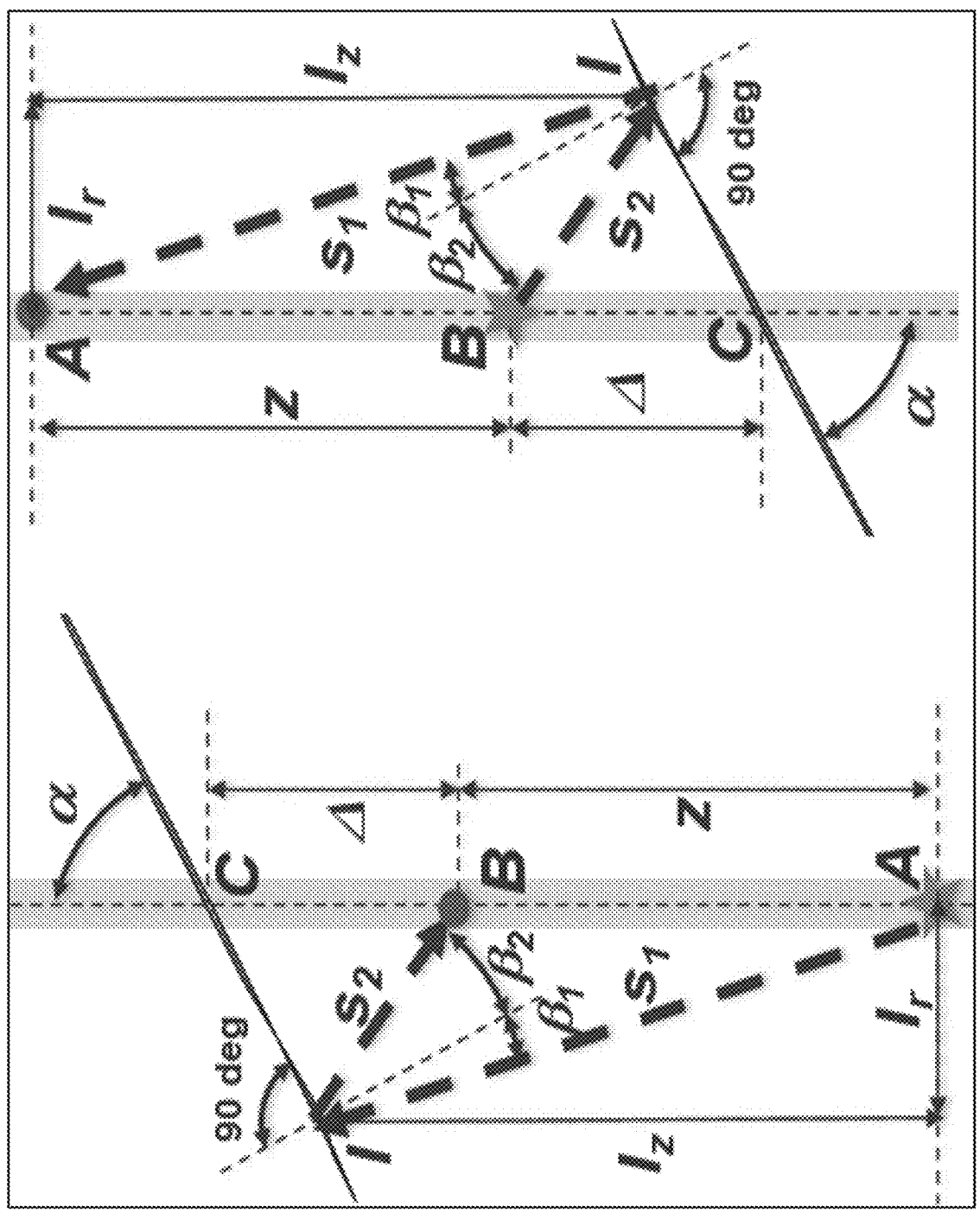
FIG. 5 illustrates reflection events when both drilling bit and receiver are on the same side of the reflector. Left-receiver and drilling bit are below the reflector and the reflector is imaged by the down-going reflections. Right-receiver and drilling bit are above the reflector and the reflector is imaged by the up-going reflections.

Turning first to a case when both drill bit and acoustic source are either below or above reflecting boundary, FIG. 5 illustrates two situations in which a drill bit (i.e. the source of acoustic energy) and receiver are located below and above a reflector. A reflective boundary crosses the borehole in point C at an angle α. Reciprocity is utilized to derive equations for the reflection travel time in these cases as the reflection events are symmetric relative to points A and B-expression is the same when A is a transmitter and B is a receiver and vice versa. Additionally, there is a symmetry about point C as related to the locations of points A and B above or below it. When the receiver and drill bit are below the reflector, the drill bit generates a wave that travels to the reflective boundary with slowness $s_1$ at an angle $\beta_1$ to the reflector normal, reflects at point I and travels to the receiver slowness $s_2$ at an angle $\beta_2$ to the normal to impedance boundary. When the receiver and drill bit are above the reflector that the drill bit generates, a wave that travels to the reflective boundary with slowness $s_2$ at an angle $\beta_2$ to the normal to the impedance boundary, reflects at point I and travels to the receiver with slowness $s_1$ at an angle $b_1$ to the reflector normal. If there is a P-S or S-P mode conversion, then $s_1 \neq s_2$ and $\beta_1 \neq \beta_2$ and these values are equal otherwise. Alternatively, we can still have $s_1 \neq s_2$ and $\beta_1 + \beta_2$ even in the absence of mode conversion but when the formation properties change.

The following notations are utilized herein: z=|AB|—the source-receiver distance, Δ=|BC|—distance from the transducer (receiver of drill bit) closest to the point where reflector crosses the borehole. For each point ($I_r$, $I_z$) of the migrated image, the travel time to that point is given by:

$$T = s_1|IA| + s_2|IB| = s_1\sqrt{I_z^2 + I_r^2} + s_2\sqrt{(I_z - z)^2 + I_r^2}, \quad (8)$$

Figure 6:
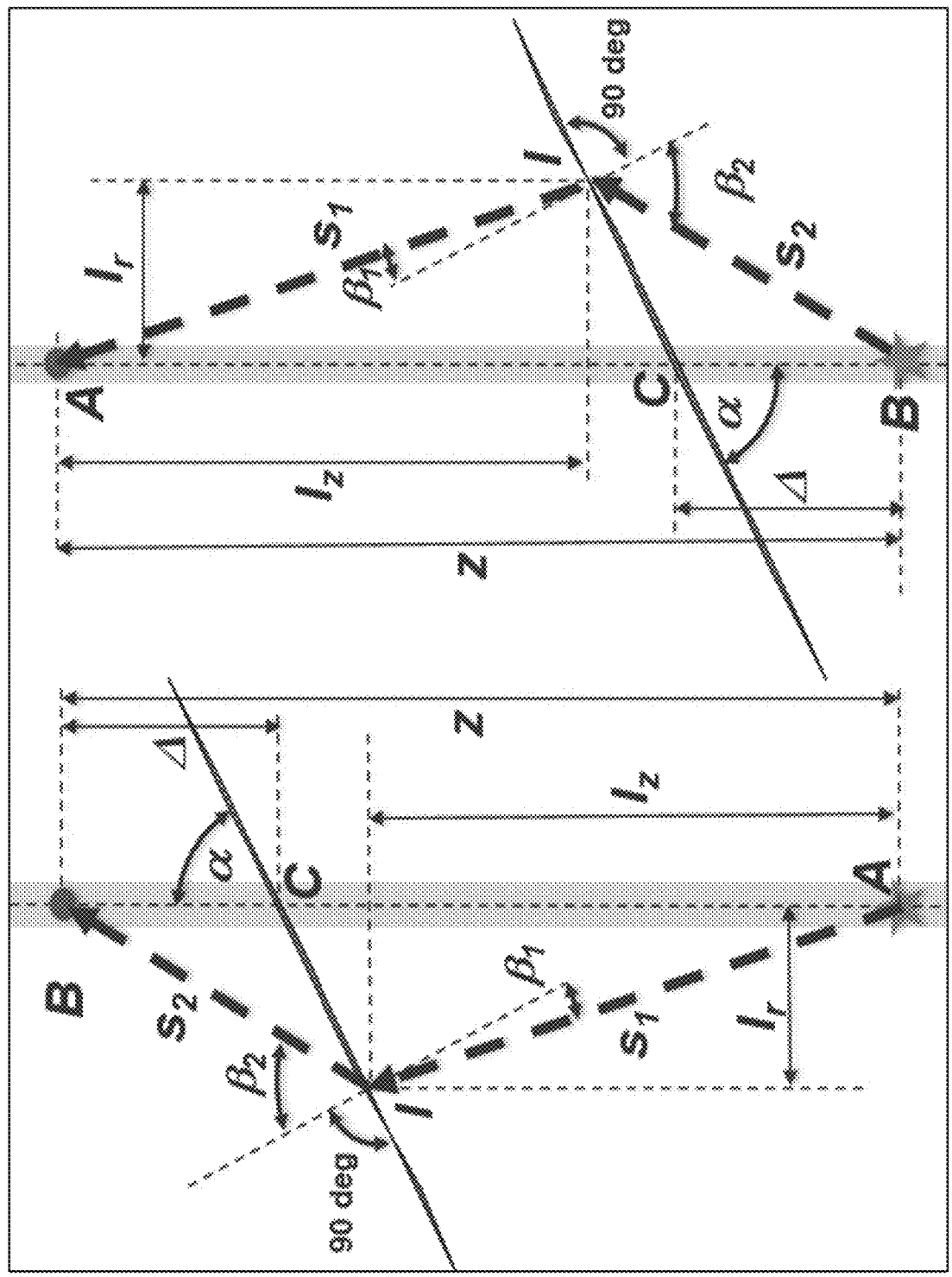
FIG. 6 illustrates mode-conversion refractions when an interface is between a drilling bit and receiver. Left-receiver is closer to the interface and the interface is imaged using S-P mode conversion. Right-drilling bit is closer to the interface and the interface is imaged using P-S mode conversion.

When an interface (fracture or bedding boundary) intersects the borehole between the drill bit and receiver, refraction can be used to image these interfaces under certain conditions. In these situations, the amplitude of the signal corresponding to the imaged interface does not represent the reflectivity of that interface. Instead, the amplitude of this signal represents the average signal-to-noise ratio of the refracted arrival. FIG. 6 illustrates two situations in which an interface crosses the borehole at point C between the drill bit below and receiver above. FIG. 6 (left) illustrates a case when a receiver is closer to an interface than the drill bit. In this case, the drill bit location is marked A, and it generates a wave that travels to the interface with slowness $s_1$ at an angle $\beta_1$ to the reflector normal, refracts at point I, and travels to the receiver in location B with slowness $s_2$ at an angle $\beta_2$ to the interface normal. FIG. 6 (right) shows a case when a drill bit is closer to an interface than a receiver. In this second case, the drill bit location is marked B, and it generates a wave that travels to the interface with slowness $s_2$ at an angle $\beta_2$ to the interface normal, refracts at point I, and travels to the receiver location A with slowness $s_1$ at an angle $\beta_1$ to the interface normal.

The following notations are utilized herein: z=|AB|—the source-receiver distance, Δ=|BC|—distance from the transducer (receiver or drill bit) closest to the point where the interface crosses the borehole. Also illustrated in FIG. 6 are radial distance $I_r$ of the point I from the borehole and vertical distance $I_z$ of that point from the drilling bit (when the drilling bit is further from the interface than receiver) or from receiver (when the receiver is further from the interface than the drilling bit). In these cases, both scenarios are imaging the interface with up-going waves, and this is only possible if mode conversions occur across the interface. Specifically, mode conversion occurs for $s_1 > s_2$ and $\beta_1 < \beta_2$. For each point ($I_r$, $I_z$) in the depth-migrated image, the travel time of the refracted wavefield is given by equation (8), with the understanding that the slownesses reflect S-P and P-S mode conversions for the up-going and down-going wavefields, respectively.

Figure 7:
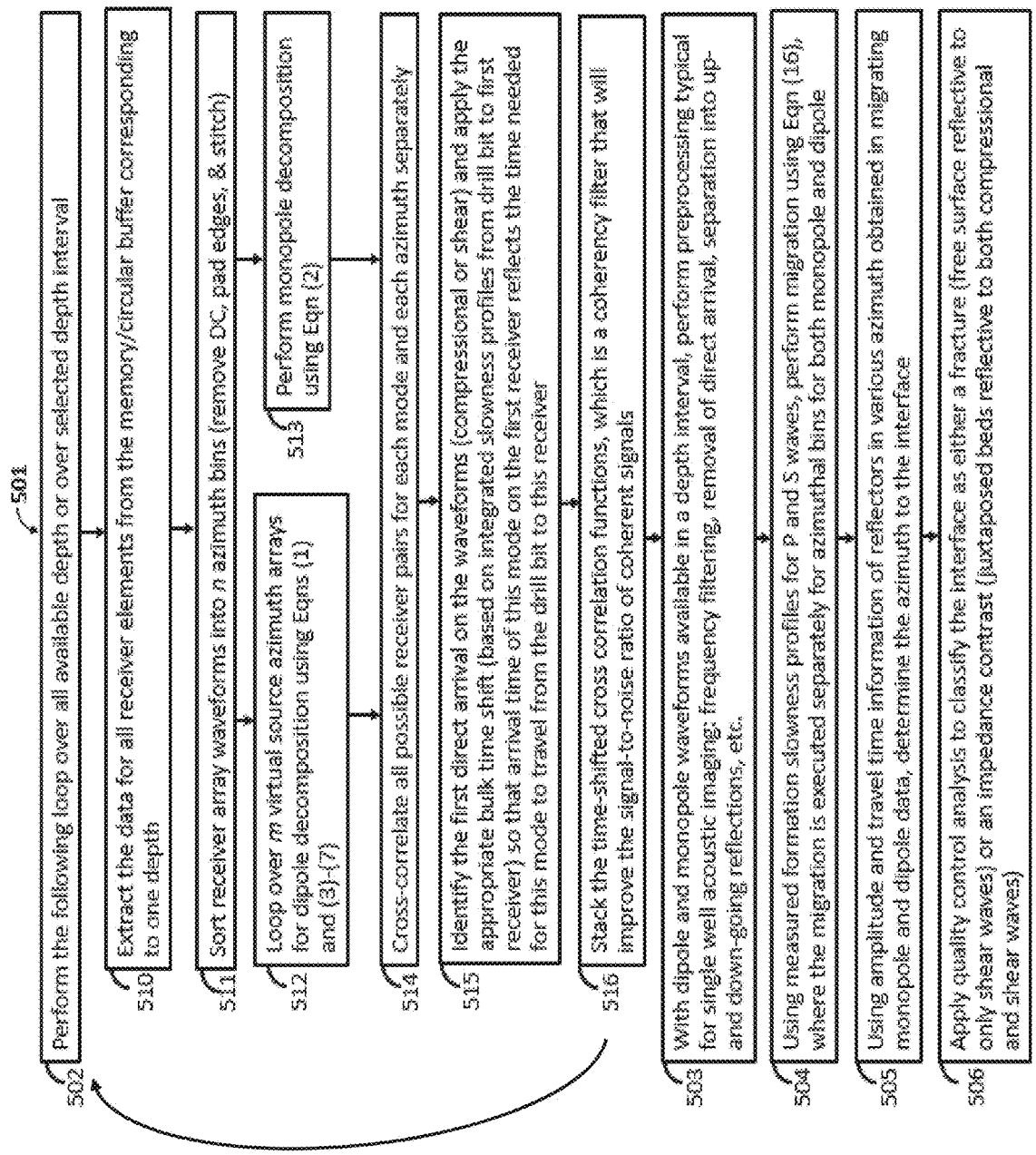
FIG. 7 illustrates one embodiment of an interface imaging workflow.

Interface imaging workflow: The interface imaging workflow in outlined in FIG. 7. We first start with a loop (502) outlined in steps 510-516 that constructs time series for a desired depth interval. In the following we assume the LWD tool has n receiver stations and a directional package which measures tool azimuth (or high side of the well in case of a deviated well). In this loop we: a) extract the recorded data for all receiver elements separately corresponding to each depth (510), which may use time-depth drilling information to determine the time bins related to each depth; b) the data are sorted into azimuth bins and some preprocessing is applied to remove DC, pad edges, etc. (511); c) construct dipole (via Eqns (1) and (3)-(7)) and monopole (Eqn (2)) modes via steps 512 and 513 correspondingly; d) cross-correlate pairs of receiver waveforms that belong to the same mode (monopole or dipole) and to the same azimuth bin (514); e) depending on the mode (shear or compressional) we apply appropriate time shift(s) (515) to the cross-correlation functions using the integrated measured slowness between the drill bit and the receiver(s); f) stack the time-shifted cross-correlation functions (516) to improve the signal-to-noise ratio of interface reflections and refractions, which can vary across different receivers for various reasons (FIG. 8).

After loop 502 is executed in the depth interval of interest, we proceed with steps 503 through 506. These steps include: a) processing to remove direct arrivals and to improve SNR of reflection events using techniques including but not limited to frequency and FK filtering, removal of direct arrivals and separation of the reflected wavefields into up- and down-going reflections (503); b) migration of wavefields using measured slowness profile via equation (8) (504); c) determining the azimuth to the interfaces relative to the borehole using amplitude and travel time variation with azimuth of the migrated interfaces (505); d) analysis using P and S reflections and mode-conversion refractions to distinguish between fractures and bedding interfaces (506).

Figure 8:
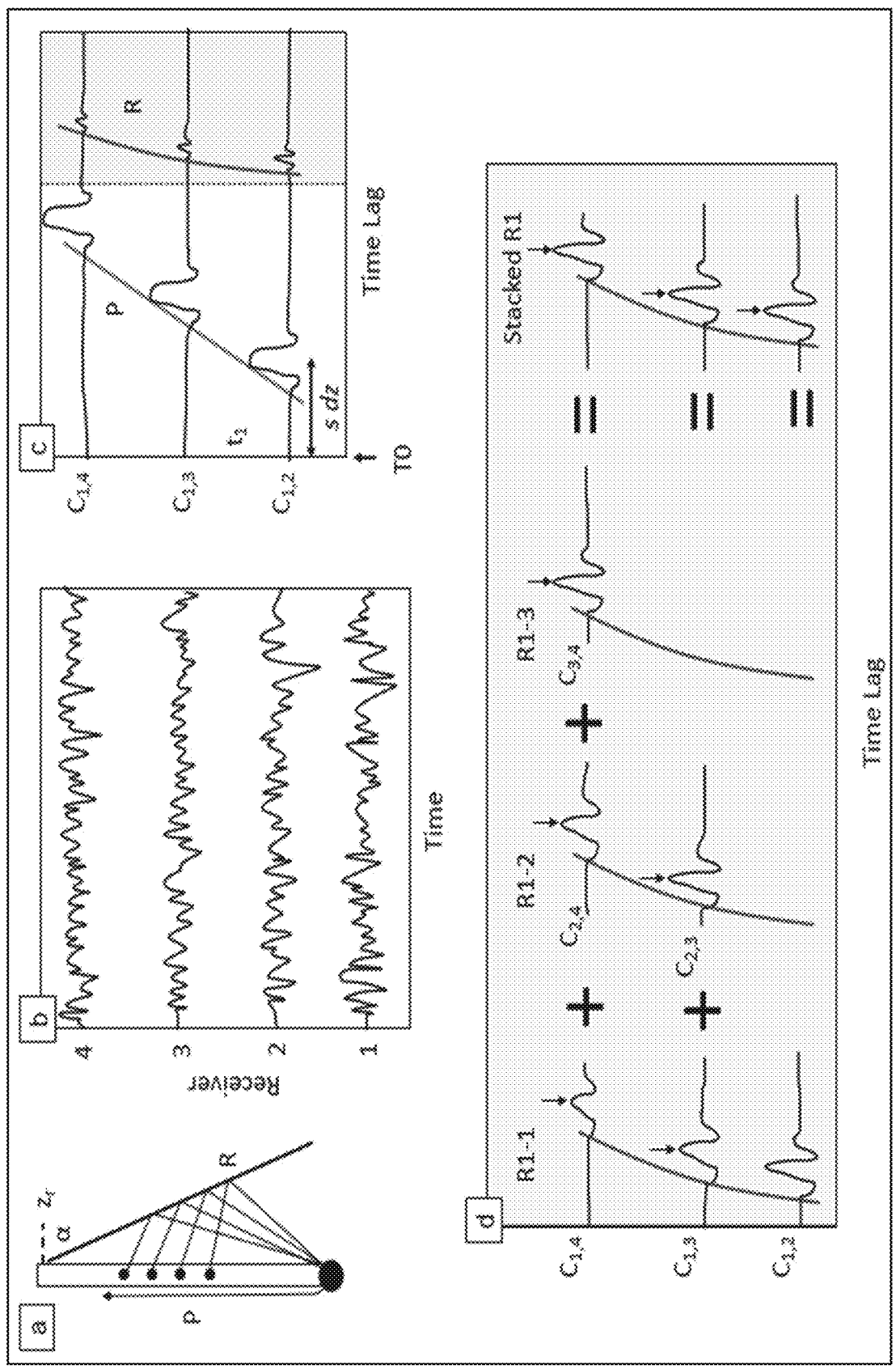
FIG. 8 illustrates an embodiment of an interface imaging workflow.

FIG. 8. Schematic explaining interface imaging workflow. (a) Simplified tool source/receiver geometry with respect to primary and reflected ray paths. (b) Recorded noise that followed the primary and reflector ray paths from the drill bit to receivers. (c) Cross-correlation of receiver 1 with receivers 2 and 3, showing example of primary and reflected arrivals and decreasing correlation with increasing source-receiver offset. (d) Multi-channel cross correlations and subsequent stacking after alignment to peak values are used to create stacked reflection wavelets that improve signal-to-noise ratio for final amplitude and travel time picks.

The methods and systems of the present disclosure may, in part, use one or more models that are machine-learning algorithms. These models may be supervised or unsupervised. Supervised learning algorithms are trained using labeled data (i.e., training data) which consist of input and output pairs. By way of example and not limitation, supervised learning algorithms may include classification and/or regression algorithms such as neural networks, generative adversarial networks, linear regression, etc. Unsupervised learning algorithms are trained using unlabeled data, meaning that training data pairs are not needed. By way of example and not limitation, unsupervised learning algorithms may include clustering and/or association algorithms such as k-means clustering, principal component analysis, singular value decomposition, etc. Although the present disclosure may name specific models, those of skill in the art will appreciate that any model that may accomplish the goal may be used.

Figure 9:
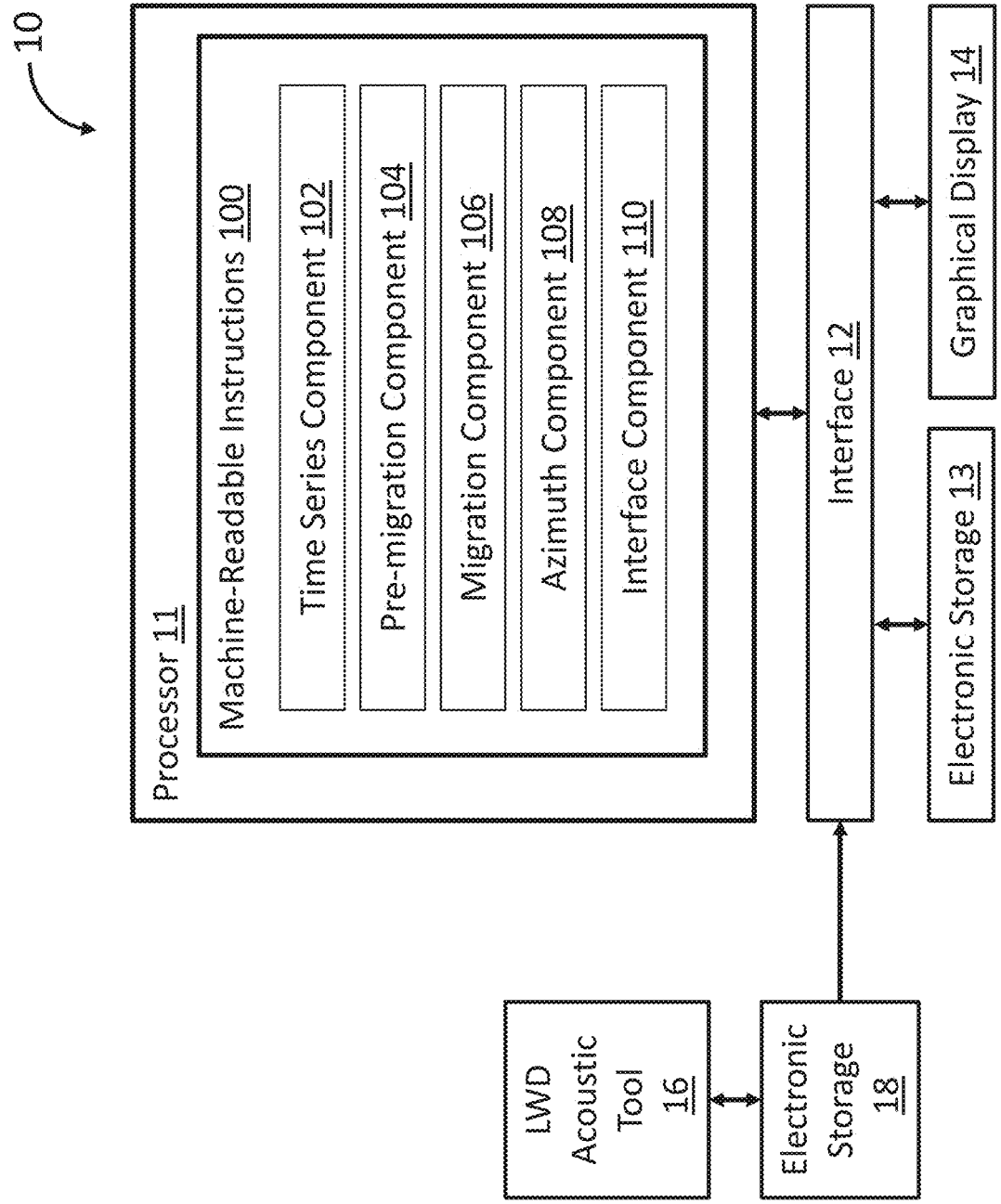
FIG. 9 illustrates an example system for an interface imaging workflow.

The methods and systems of the present disclosure may be implemented by a system and/or in a system, such as a system 10 shown in FIG. 9. The system 10 may include one or more of a processor 11, an interface 12 (e.g., bus, wireless interface), an electronic storage 13, a graphical display 12, and/or other components. The processor 11 will receive seismic data generated by a drill bit and recorded during the drilling process and will produce an image of interfaces (reflectors or impedance boundaries) in the vicinity of the borehole.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to seismic data, seismic images, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 9 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to seismic data, seismic images, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate seismic imaging around a wellbore. The machine-readable instructions 100 may include one or more computer program components. In an embodiment, the machine-readable instructions 100 may be stored on non-transitory computer readable storage medium. The machine-readable instructions 100 may include a time series component 102, a pre-migration component 104, a migration component 106, an azimuth component 108, an interface component 110, and/or other computer program components.

It should be appreciated that although computer program components are illustrated in FIG. 9 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the time series component 102 may be configured to construct the time series for a desired depth interval. This is done for both monopole and dipole.

The pre-migration component 104 may be configured to prepare the time series for migration. This preparation may be any processing typical for acoustic imaging, such as frequency filtering, removal of the direct arrival, separation of the up-going and down-going reflections, and the like.

The migration component 106 may be configured to perform migration. The migration is executed separately for azimuthal bins for both monopole and dipole.

The azimuth component 108 may be configured to determine the azimuth to the interface based on the amplitude and travel time information of reflectors in the various azimuths in the migration.

The interface component 110 may be configured to classify the interfaces as fractures or an impedance contrast.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing seismic data, the method comprising:
   a. obtaining seismic data, wherein the seismic data was acquired throughout a region of interest with a plurality of azimuthal receiver elements of a logging-while-drilling tool while a drill bit is drilling a wellbore;
   b. decomposing the seismic data into monopole and dipole modes to obtain a monopole mode and a dipole mode;
   c. cross-correlating each receiver pair of the monopole mode and of the dipole mode to generate a monopole waveform and a dipole waveform;
   d. identifying a time of direct arrival of acoustic energy from the drill bit and applying bulk time shift for each of the monopole waveform and the dipole waveform;
   e. stacking corresponding waveforms from the bulk time shift to improve signal-to-noise ratio to generate a stacked monopole waveform and a stacked dipole waveform;
   f. processing the stacked monopole waveform and the stacked dipole waveform to isolate reflected arrivals;
   g. performing migration on the reflected arrivals to obtain a monopole migrated image and a dipole migrated image; and
   h. classifying the interface as either a fracture or an impedance contrast using the monopole migrated image and the dipole migrated image.

2. The method of claim 1, wherein the method is azimuthally-dependent, comprising:
   a. prior to the cross-correlating, binning the monopole mode and the dipole mode into a plurality of azimuth bins;
   b. cross-correlating the monopole mode and the dipole mode in each azimuth bin separately;
   c. identifying a time of direct arrival of acoustic energy from the drill bit and applying bulk time shift for each of the monopole waveform and the dipole waveform in each of the azimuth bins;
   d. stacking corresponding waveforms from the bulk time shift to improve signal-to-noise ratio to generate a stacked monopole waveform and a stacked dipole waveform in each of the azimuth bins;
   e. processing the stacked monopole waveform and the stacked dipole waveform to isolate reflected arrivals;
   f. performing migration on the reflected arrivals to obtain a monopole migrated image in each of the azimuth bins and a dipole migrated image in each of the azimuth bins; and
   g. determining the azimuth from the wellbore to the interface based on amplitude and travel time information in the monopole migrated image and the dipole migrated image.

3. The method of claim 1 wherein the obtaining the seismic data comprises:
   a. drilling the wellbore in a subsurface volume of interest with a drill string comprising a drill bit and a logging while drilling tool, wherein the logging while drilling tool comprises a plurality of azimuthal receiver elements and wherein the drill bit is utilized as a seismic source;
   b. recording seismic data at the plurality of azimuthal receiver elements continuously throughout formations of interest while the drill bit is drilling the wellbore; and c. storing the seismic data in a non-transitory computer readable medium.

4. The method of claim 3 wherein the seismic data is first stored on the non-transitory computer readable medium located on the logging while drilling tool and then transferred to a second non-transitory computer readable medium for the rest of the method.

\* \* \* \* \*